United States Patent
Kleifges et al.

(10) Patent No.: US 11,262,745 B2
(45) Date of Patent: Mar. 1, 2022

(54) METHOD FOR OPERATING A REDUNDANT AUTOMATION SYSTEM TO INCREASE AVAILABILITY OF THE AUTOMATION SYSTEM

(71) Applicant: Siemens Aktiengesellschaft, Munich (DE)

(72) Inventors: Georg Kleifges, Waldbronn (DE); Juergen Laforsch, Buehl (DE)

(73) Assignee: Siemens Aktiengesellschaft, Munich (DE)

( * ) Notice: Subject to any disclaimer, the term of this patent is extended or adjusted under 35 U.S.C. 154(b) by 714 days.

(21) Appl. No.: 15/596,269

(22) Filed: May 16, 2017

(65) Prior Publication Data

US 2017/0351252 A1 Dec. 7, 2017

(30) Foreign Application Priority Data

May 17, 2016 (EP) .................................. 16169894

(51) Int. Cl.
*G05B 23/02* (2006.01)
*G05B 19/042* (2006.01)

(52) U.S. Cl.
CPC ..... *G05B 23/0289* (2013.01); *G05B 19/0428* (2013.01); *G05B 23/0213* (2013.01); *G05B 2219/14131* (2013.01); *G05B 2219/24186* (2013.01)

(58) Field of Classification Search
CPC ....................................................... H04L 1/22
See application file for complete search history.

(56) References Cited

U.S. PATENT DOCUMENTS

| 5,099,153 A | * | 3/1992 | Adams ...................... G06F 1/04 327/292 |
| 5,777,874 A | * | 7/1998 | Flood ................... G05B 19/058 700/82 |
| 6,356,795 B1 | | 3/2002 | Barthel et al. |

(Continued)

FOREIGN PATENT DOCUMENTS

| CN | 101030073 | 9/2007 |
| CN | 103107904 | 5/2013 |

(Continued)

OTHER PUBLICATIONS

Office Action dated May 29, 2020 issued in Chinese Patent Application No. 201710345783.0.

(Continued)

*Primary Examiner* — Kenneth M Lo
*Assistant Examiner* — Jonathan Michael Skrzycki
(74) *Attorney, Agent, or Firm* — Cozen O'Connor

(57) ABSTRACT

A method for operating a redundant automation system having a plurality of subsystems, wherein one subsystem of the plurality of subsystems operates as a master and assumes process control and the other subsystem operates as a reserve during redundant operation, where measures are provided by which the availability of the redundant automation system is increased, and where regardless of whether transient errors occur on the subsystem of the plurality of subsystems operating as the master or on the subsystem operating as the reserve, a total failure of the automation system is largely avoided.

8 Claims, 3 Drawing Sheets

(56) References Cited

U.S. PATENT DOCUMENTS

2006/0174318 A1* 8/2006 Shelest .................. G06F 21/53
  726/1
2008/0155318 A1* 6/2008 Shelvik ............. G05B 19/0428
  714/12
2015/0095690 A1 4/2015 Grosch et al.

FOREIGN PATENT DOCUMENTS

| CN | 103955188 | 7/2014 |
| EP | 0 907 912 B1 | 5/2000 |
| EP | 2 765 464 A1 | 8/2014 |

OTHER PUBLICATIONS

Office Action dated Apr. 6, 2021 issued in Chinese Patent Application No. 201710345783.0.
Office Action dated Oct. 25, 2019 issued in Chinese Patent Application No. 201710345783.0.

* cited by examiner

— Prior Art —

METHOD FOR OPERATING A REDUNDANT AUTOMATION SYSTEM TO INCREASE AVAILABILITY OF THE AUTOMATION SYSTEM

BACKGROUND OF THE INVENTION

1. Field of the Invention

The invention relates to a method for operating a redundant automation system having two subsystems, where one of the subsystems operates as a master and assumes process control and the other subsystem operates as a reserve during redundant operation.

2. Description of the Related Art

EP 0 907 912 B1 discloses a method for operating redundant subsystems. Here, two subsystems are coupled in an event-synchronized manner, where at appropriate program points at which provision is made for data synchronization, both subsystems await a response from the other respective participant and only on receiving the response do they each continue their program processing synchronously. However, this often results in synchronization problems when transient errors occur in one of the two subsystems. A possible cause of such temporary errors, which can usually not be localized, may be "bit dumpers" in the main memory, "bit dumpers" in the ASIC, firmware errors or erroneous behavior of a program or program segment, where this behavior only occurs under specific conditions. A transient error may result in the total failure of both subsystems because, usually to start troubleshooting, the subsystem operating as a reserve is transferred to a STOP status and the "faulty" subsystem still runs and operates as the master fails shortly after this transfer. Due to such a total failure, the process to be controlled is first shut down, the defective subsystem replaced and finally the process re-started, which means a long downtime.

EP 2 765 464 A1 discloses a method for operating a redundant automation system, by which disruptive effects of a transient error are largely avoided.

SUMMARY OF THE INVENTION

It is therefore an object of the present invention to provide a method for operating an automation system which increases the availability of the automation system.

This and other objects and advantages are achieved in accordance with the invention by a method and automation system in which, regardless of whether transient errors occur on the subsystem operating as a master or on the subsystem operating as a reserve, the total failure of the automation system is advantageously largely avoided.

The invention is based on the idea of not initiating troubleshooting in the subsystem operating as a reserve immediately after a loss of synchronization, but with a time delay to determine the cause of a loss of synchronization or the potential error on the reserve subsystem. In the event of the master subsystem failing due to a transient error, this largely avoids the reserve already being in troubleshooting mode and the automation system consequently failing completely during troubleshooting. The time delay or the period of time is selected such that in the event of the master subsystem failing during this period of time, the reserve can assume process control, where in this case the reserve does not activate or initiate troubleshooting in the first place. The complete failure of the automation system is understood to mean that neither the master subsystem nor the reserve subsystem can assume process control.

After troubleshooting of the reserve subsystem, the master supplies the reserve as part of an update with relevant (control) data, where after the update the reserve subsystem, as the new master subsystem, assumes process control and the master subsystem, as the new reserve subsystem, initiates further troubleshooting. Thereby, a check is made as to whether the "old" master subsystem ("new" reserve subsystem) is responsible for the cause of the loss of synchronization or for the error, where the "new" master subsystem ("old" reserve subsystem) assumes process control in solo operation with relevant control or process data.

In an embodiment of the invention, after the predefined period of time (timeout) and in the event that the reserve subsystem detects an error during troubleshooting, the reserve subsystem adopts a defective status. The master subsystem still controls the process in solo operation and it is possible for a service technician to replace the reserve. The defective status of the reserve subsystem is understood to mean the faulty operation of the reserve subsystem, in the context of which the reserve subsystem cannot bring about process control.

In a further embodiment of the invention, in the event that the master subsystem fails or is interrupted during troubleshooting and is therefore unable to realize or continue operating as the master subsystem or providing process control, the master subsystem first transfers internal master data to the reserve subsystem and displays a defective status, where the reserve subsystem assumes process control as the new master subsystem. This switchover or change of master does not occur "shock-free" (rather, due to the switchover, there is a step change in or impact on the values at the process outlets), but the failure of the automation system is also avoided in this case.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

With reference to the drawing, in which an exemplary embodiment of the invention is illustrated, hereinafter the invention, its embodiments and advantages are explained in more detail, in which.

The same parts in FIGS. 1 and 2 have the same reference characters.

DETAILED DESCRIPTION OF THE EXEMPLARY EMBODIMENTS

Figure 2:
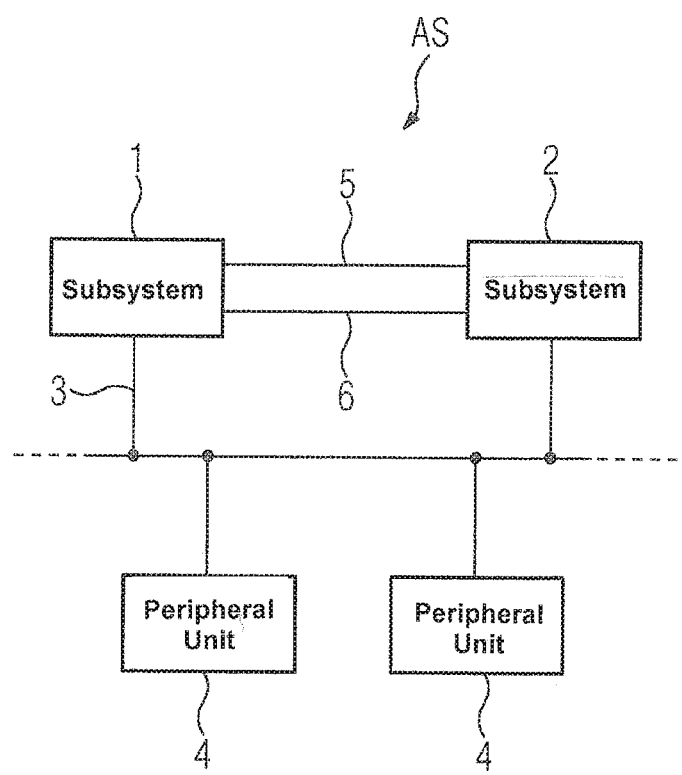
FIG. 2 is an illustration of a conventional redundant automation system.

Reference is first made to FIG. 2 which shows a conventional redundant automation system. This has a first and a second subsystem 1, 2 which are connected to peripheral units 4 via a fieldbus 3. The fieldbus 3, for example, complies with the PROFIBUS-DP specification. In principle, other bus systems, such as Ethernet (ProfiNet system redundancy), Modbus or also parallel bus systems are also suitable. The peripheral units 4 receive signals via input lines from transducers or transmitters that serve to acquire a process status, and via output lines output signals to actuators with which the process is influenced. The process and the transducers, detectors and actuators are not shown in the figure for the sake of clarity. The two subsystems 1, 2 process the same control program, where one of the subsystems 1, 2 assumes the master function (mastery) and the other subsystem 1, 2 the reserve function, where only the subsystem 1, 2 that exercises the master function and/or operates as the master accesses the peripheral units for reading and/or writing purposes. In the event that the subsystem 1, 2 operating as the master system fails, the other subsystem 1, 2 assumes the master function. To enable both subsystems 1, 2 to process their respective control programs or program paths synchronously, these are synchronized via two synchronization links 5, 6, where the redundancy and monitoring functions are realized via these two synchronization links 5, 6.

During redundant operation of the automation system AS, such as due to a memory error that is not detected in good time, a loss of synchronization may be detected and the automation system AS therefore transferred from redundant operation to solo operation, where furthermore in the context of troubleshooting the subsystem 1, 2 on which the error is located or which is responsible for the loss of synchronization is localized.

Figure 1A:
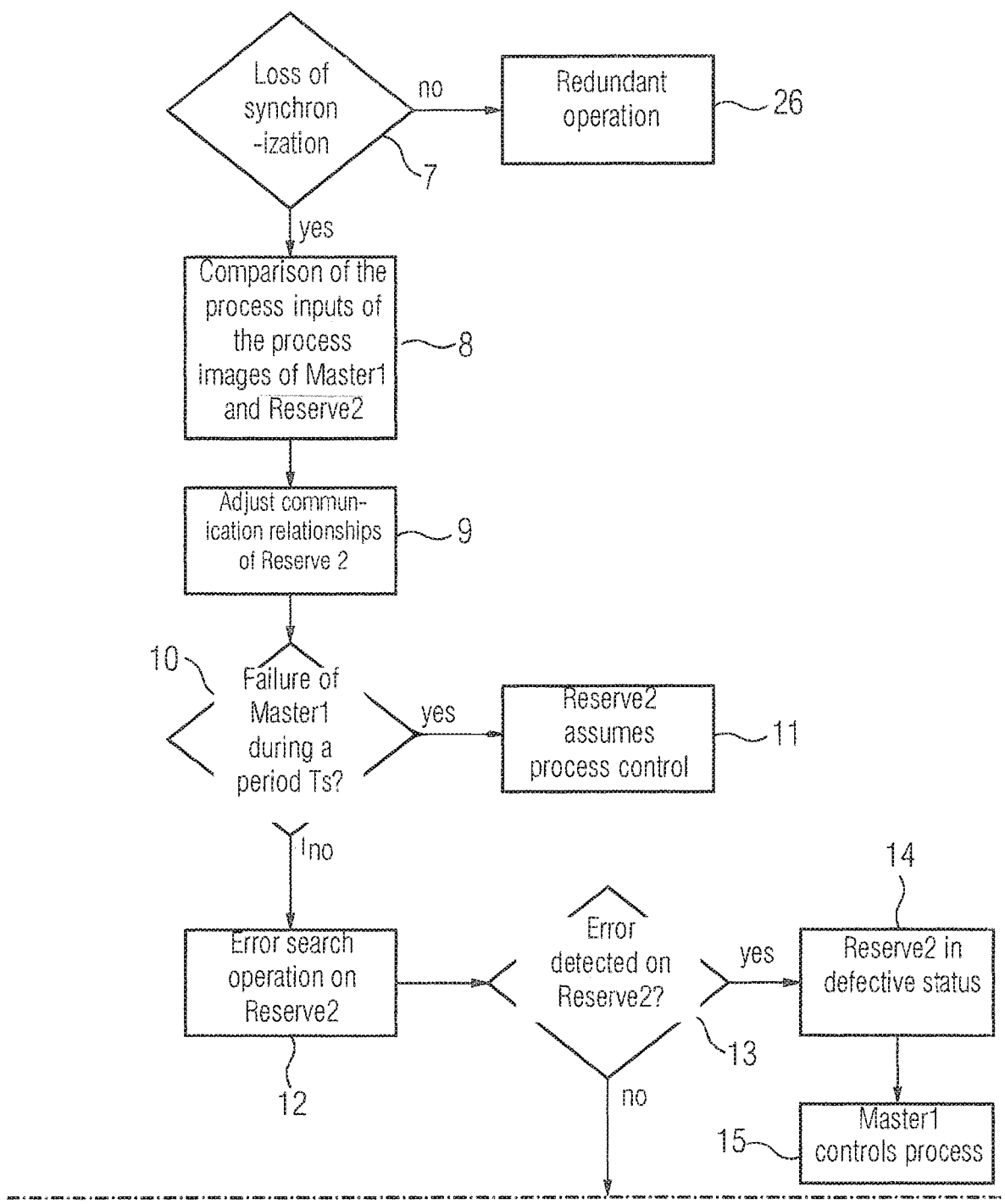
FIGS. 1A and 1B is a flowchart of the method in accordance with the invention.
Figure 1B:
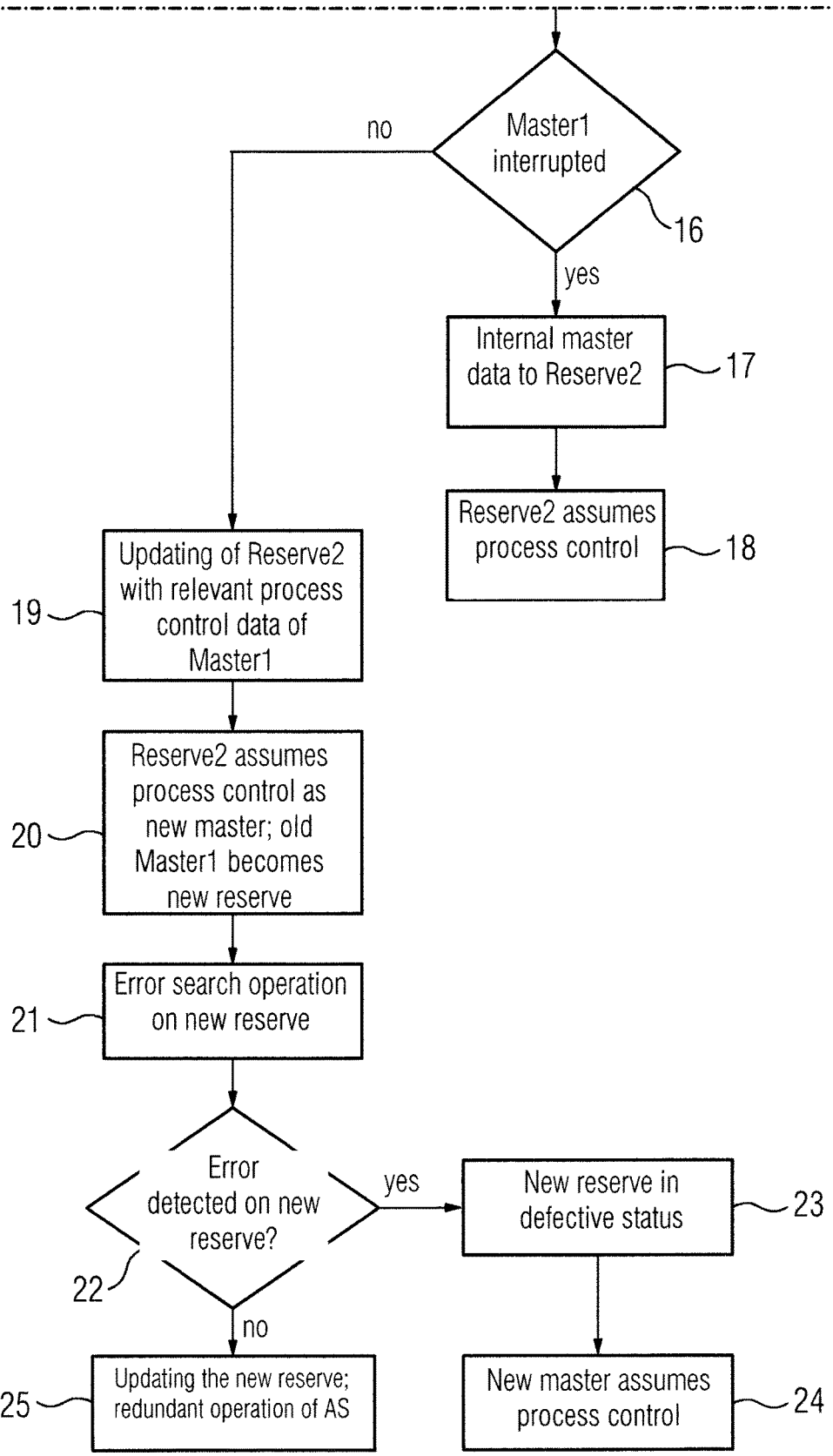

Hereinafter reference is made to FIG. 1, in which a flow chart is shown in order to illustrate troubleshooting. It is assumed that the subsystem 1 (CPU 1) operates as the master and the subsystem 2 (CPU 2) as the reserve and a loss of synchronization (branch 7) was detected via appropriate redundancy and monitoring functions of the master 1 and the reserve 2, whereby the automation system AS changes from redundant operation 26 to solo operation.

In the context of a first operation 8, first process inputs of a process image of the master 1 are compared with process inputs of a process image of the reserve 2 and in a further operation 9 the communication of the reserve 2 with further components of the automation system AS (not shown) is adjusted. In the context of the operation 9, furthermore the reserve 2 does not transmit any process output signals to the peripheral units 4. To prevent the automation system AS from failing completely during troubleshooting of the reserve 2 because the master 1 is faulty, the reserve 2 only initiates troubleshooting after a predefined period of time or time delay Ts (decision or branch 10). This time delay Ts, which is configurable via an engineering system of the automation system AS, is selected such that the reserve 2 can still reliably assume process control before a possible defect or failure of the master 1 (operation 11). Here, the reserve 2 does not activate or initiate troubleshooting in the first place. It should be noted that a defect or defective status is understood to mean the interrupted operation of a faulty subsystem, in the context of which this subsystem is unable to implement process control.

In the event that the master 1 has not failed during this predefined period of time Ts, the reserve 2 initiates troubleshooting (step or operation 12). In the event that the reserve 2 detects that it is faulty (branch 13), which means that the reserve 2 is responsible for the loss of synchronization, the reserve 2 switches to a "defective" status (operation 14), where the master continues process control (operation 15).

The reserve 2 notifies a service technician of this defective status using appropriate indicator means. The defective status therefore shows the service technician which CPU (CPU assembly, CPU module) needs replacing.

It is possible that during troubleshooting of the reserve 2 the master 1 fails with regard to process control (branch 16). In this case, the reserve 2 adopts the internal master data (values of a timer, values of a counter, contents of data modules, . . . ) in one step 17 and then assumes process control, where the change does not occur "shock-free" (operation 18). A service technician can replace the interrupted master 1 with a new CPU (CPU assembly, CPU module).

In contrast, in the event that the master 1 is not interrupted during troubleshooting of the reserve 2 (branch 16), after troubleshooting the reserve 2 is "updated" by the master 1 in an operation 19 whereby the reserve 2 adopts all the relevant process control data of the master 1. As a result, it becomes possible to transfer the automation system AS from solo operation to redundant operation at a later time when both the master 1 and the reserve 2 have each finished troubleshooting. After updating the reserve 2, as the "new" master the reserve 2 assumes mastery or process control (operation 20) and the master 1 operates as the "new" reserve that initiates further troubleshooting in an operation 21 to thus detect whether the "new" reserve (i.e., the "old" master 1) is faulty. If the "new" reserve ("old" master 1) has not detected any error, the "new" reserve ("old" master 1) is "updated" with the relevant process control data of the "new" master ("old" reserve 2) and the automation system AS changes from solo operation to redundant operation (operation 25) again. In contrast, if the "new" reserve has detected an error, then the "new" reserve changes to a defective status (operation 23) and the "new" master ("old" reserve 2) assumes process control in a solo operation.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for operating a redundant automation system having a plurality of subsystems, a subsystem of the plurality of subsystems operating as a master and assuming process control and another subsystem of the plurality of systems operating as a reserve during redundant operation, and the master and the reserve systems being synchronized via communication in an event of a loss of synchronization, the method comprising:

comparing process inputs of a process image of the master subsystem with process inputs of a process image of the reserve subsystem;

adjusting a communication of the reserve subsystem with additional components of the automation system;

assuming process control as a new master subsystem by the reserve subsystem immediately if the master subsystem fails during a predefined period of time;

initiating, by the reserve subsystem, in an event that the master subsystem does not fail during the predefined period of time, troubleshooting to determine a cause of loss of synchronization after the predefined period of time has expired;

providing the reserve subsystem with relevant process control data in a context of an update after troubleshooting the master subsystem, if the reserve subsystem is not faulty; and assuming process control by the reserve system as the new master subsystem and after the update, initiating by the master subsystem further troubleshooting as the new reserve subsystem.

2. The method as claimed in claim 1, wherein the reserve subsystem adopts a defective status if the reserve detects an error during troubleshooting.

3. The method as claimed in claim 2, wherein the predefined period of time is configurable via an engineering system.

4. The method as claimed in claim 1, wherein the master subsystem transfers internal master data to the reserve subsystem and displays a defective status if the master subsystem is interrupted during troubleshooting, and wherein the reserve subsystem assumes process control as the new master subsystem.

5. The method as claimed in claim 4, wherein the predefined period of time is configurable via an engineering system.

6. The method as claimed in claim 1, wherein the predefined period of time is configurable via an engineering system.

7. A redundant automation system comprising:

a plurality of subsystems, a subsystem of the plurality of subsystems operating as a master subsystem and assuming process control and another subsystem of the plurality of subsystems operating as a reserve subsystem during redundant operation;

wherein the master subsystem and the reserve subsystem are each configured to:

compare process inputs of a process image of the master subsystem with process inputs of a process image of the reserve subsystem;

adjust a communication of the reserve subsystem with additional components of the automation system;

assume process control as a new master subsystem by the reserve subsystem immediately if the master subsystem fails during a predefined period of time;

initiate, by the reserve subsystem, in an event that the master subsystem does not fail during the predefined period of time, troubleshooting to determine a cause of loss of synchronization after the predefined period of time;

provide the reserve subsystem with relevant process control data in a context of an update after troubleshooting the master subsystem, if the reserve subsystem is not faulty; and assume process control by the reserve system as the new master subsystem and after the update, initiate by the master subsystem further troubleshooting as the new reserve subsystem.

8. The redundant automation system as claimed in claim 7, wherein the predefined period of time is configurable via an engineering system of the automation system.

\* \* \* \* \*